United States Patent [19]

Davis et al.

[11] 3,992,583
[45] Nov. 16, 1976

[54] UNIVERSAL FLEXIBLE ACOUSTIC COUPLER MUFF SYSTEM

[75] Inventors: Jimmy H. Davis; Larry E. Lamberth, both of Houston, Tex.

[73] Assignee: Texas Instruments Incorporated, Dallas, Tex.

[22] Filed: July 11, 1975

[21] Appl. No.: 595,200

[52] U.S. Cl. ................................. 179/1 C; 179/2 C
[51] Int. Cl.² .......................................... H04M 1/14
[58] Field of Search ............................ 179/1 C, 2 C

[56] References Cited
UNITED STATES PATENTS

| | | | |
|---|---|---|---|
| 3,092,688 | 6/1963 | Rector | 179/1 C |
| 3,657,479 | 4/1972 | Sereemu | 179/1 C |
| 3,733,437 | 5/1973 | Keith | 179/1 C |

FOREIGN PATENTS OR APPLICATIONS

| | | | |
|---|---|---|---|
| 996,905 | 12/1951 | France | 179/1 C |

*Primary Examiner*—Kathleen H. Claffy
*Assistant Examiner*—E. S. Kemeny
*Attorney, Agent, or Firm*—Harold Levine; Rene E. Grossman; Thomas G. Devine

[57] ABSTRACT

This universal acoustic coupler system is comprised of a pair of flexible muffs, which are rotatably mounted to permit connection to any length telephone handset receiver/transmitter; this feature also permits any varying angles of the earpiece and mouthpiece. Furthermore, the elastic structure of the muff permits the insertion of any size earpiece and mouthpiece, thereby allowing use of the muffs on an international scale. The muffs are comprised of a pair of elastic, generally circular housings, which include a speaker/microphone cavity and an earpiece/mouthpiece cavity, separated by an acoustic cavity. Features include flexible mounting arms or hinges attached to each of the muff housings. These arms have a circular aperture therein to accommodate a retaining pin which attaches the acoustic muff to an electronic input/output device. The muff attaches externally to the electronic device, and the housing folds back to overlie the mounting arms when a storage cover is put in place over the input/output device.

17 Claims, 11 Drawing Figures

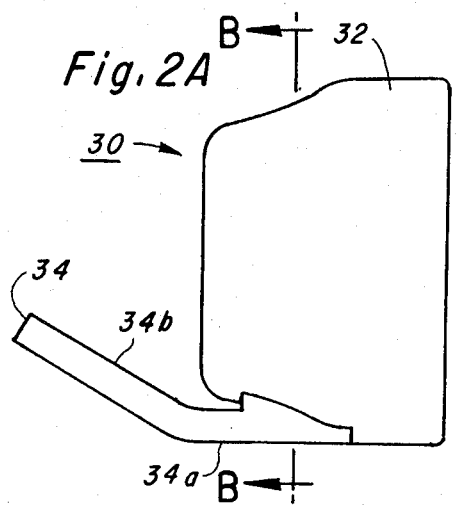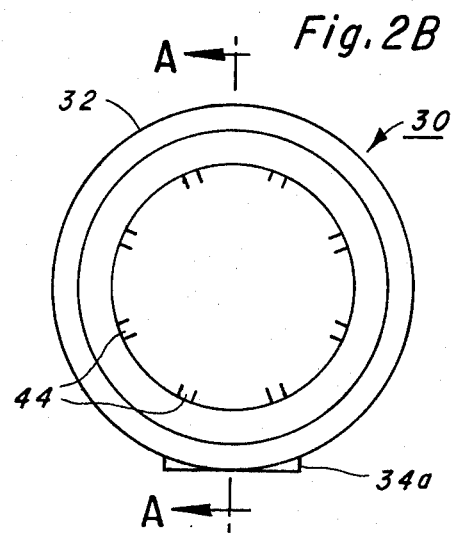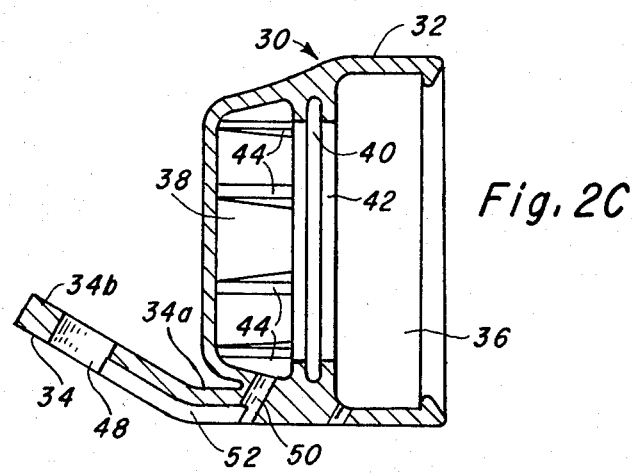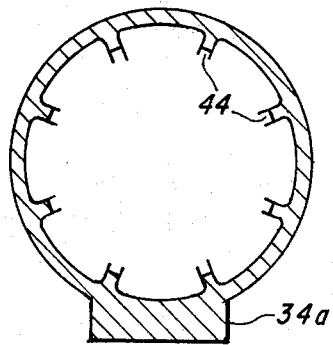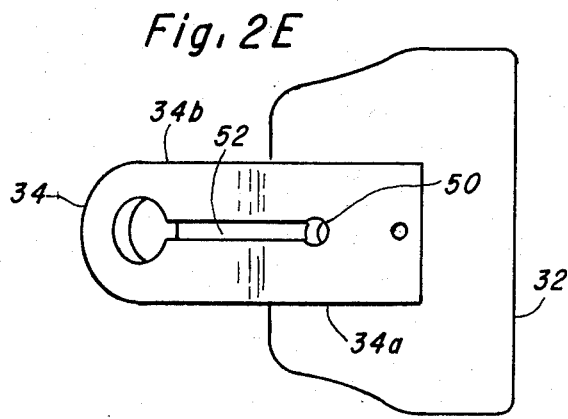

UNIVERSAL FLEXIBLE ACOUSTIC COUPLER MUFF SYSTEM

This invention relates to acoustic couplers and more particularly to an improved, universal flexible acoustic muff system.

Prior art acoustic muffs have been sized for earpiece and mouthpiece diameters and mounted to a given center distance and angle of earpiece with respect to mouthpiece. Taking this approach provides a design which is capable of interfacing with a limited number of telephone receiver handsets, namely those within that particular size range. Still further, prior acoustic coupler muffs have usually been physically located within the input/output electronic device and therefore utilize a substantial volume with the attendant reduction in the space available within the input/output device for additional components, e.g., additional electronics.

Accordingly, it is an object of the present invention to provide a universal, flexible acoustic coupler muff system which allows flexibility of movement to accommodate various sizes of telephone receiver handsets, both in earpiece/mouthpiece diameters, as well as varying center distances between earpieces and mouthpieces.

Another object of the present invention is to provide an acoustic coupler muff system, which is light in weight and thin-walled in construction.

Another object of the present invention is to provide an acoustic muff which is easy to store, and maintains the telephone receiver handset in an optimum operating position.

Other objects and features of the invention will become more readily understood from the following detailed description and appended claims when read in conjunction with the accompanying drawings, in which like reference numerals designate like parts throughout the figures thereof, and in which:

FIGS. 2A-2E illustrate various views of the acoustic muff system according to the present invention.

Figure 1A:
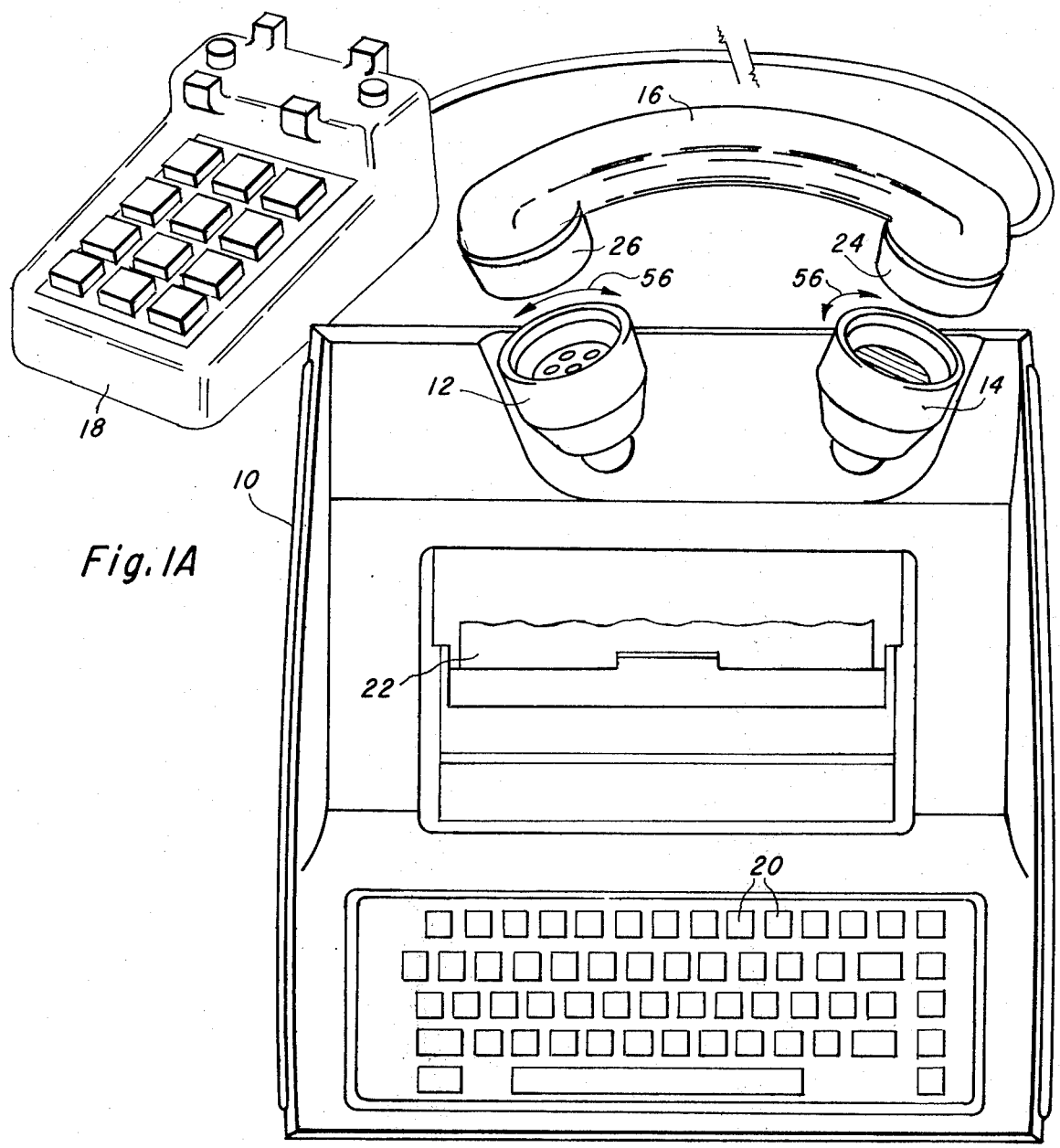
FIGS. 1A and 1B illustrate a top and side view, respectively, of an electronic input/output device utilizing the universally flexible acoustic coupler muff system according to the present invention.
Figure 1B:
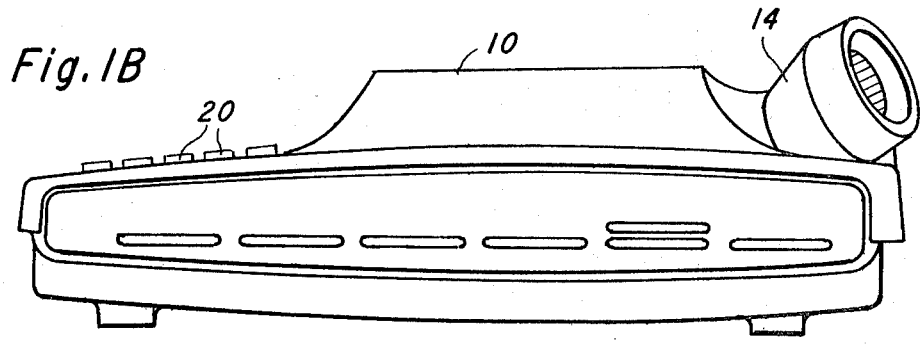

Referring now to FIGS. 1A and 1B, there is illustrated an electronic input/output device or portable data terminal 10 which is coupled through acoustic muffs 12 and 14 to telephone handset 16. The telephone handset 16 is in turn coupled to telephone 18 which interconnects terminal 10 by way of the telephone lines to a computer (not shown). Terminal 10 is normally portable and allows an operator to gain access to and receive information from a computer through the nearest available telephone 18.

When information is to be transmitted to the computer, an operator types on keyboard 20 the information to be transmitted which is also visually recorded on paper 22. Terminal 10 converts the information into a digital/audio signal which is transmitted by the speaker/mouthpiece muff 14 to the mouthpiece 24 of handset 16. Conversely, when information is to be obtained from the computer, terminal 10 accesses the computer, and the information is transmitted over the telephone lines, through earpiece 26 of handset 16, through the microphone/earpiece muff 12, and terminal 10 converts the information into readable form on paper 22.

As can be seen in FIGS. 1A and 1B, muffs 12 and 14 are located exteriorly to the frame of terminal 10. By mounting muffs 12 and 14 externally to the terminal 10, a volume reduction and compactness is achieved which was heretofore not obtainable. In FIG. 1B, it can be seen that the muff 14 extends above the top of the terminal 10 which, if the muff were enclosed, would mean that the volume of the terminal would be increased. Further, the space beneath the muffs 12 and 14 may be used for other purposes, e.g., the electronics.

FIG. 2A shows a typical muff 30 which is identical to the acoustic muffs 12 and 14. Acoustic muff 30 is made of a flexible elastic thermoplastic rubber, e.g. Kraton, manufactured and sold by Shell Oil Company. The muff 30 may be formed by compression molding techniques but, in the preferred embodiment, is formed by injection molding. The muff 30 is composed of a housing 32 which is generally circular (see FIG. 2B) and has integrally attached to it a flexible mounting hinge or arm 34 which is composed of a first section 34a attached to the housing 32 and a second section 34b attached to the first section 34a and formed at an angle to said first section 34a.

FIG. 2B illustrates a front view of acoustic muff 30, and FIG. 2C illustrates a cut-away section taken along section lines A—A (shown in FIG. 2B). As can be seen most clearly in FIG. 2C, housing 32 is comprised of essentially three circular cavities. The first or earpiece/mouthpiece cavity 36 accommodates either the earpiece 24 or mouthpiece 26 of telephone handset 16 (shown in FIG. 1A). The second or speaker/microphone cavity 38 accommodates the speaker or microphone which interconnects to terminal 10. A circular groove 40 is formed between cavities 36 and 38 and provides a means for holding the microphone or speaker for terminal 10 in place. FIG. 2C illustrates the third or acoustic cavity 42 which is located between the speaker/microphone cavity 38 and the earpiece/mouthpiece cavity 36; acoustic cavity 42 is necessary in order to maximize acoustic coupling between the earpiece/mouthpiece and the speaker/microphone. Ribs 44 encircle the speaker/microphone cavity 38 and provide structural integrity for the walls of the speaker/microphone cavity. Ribs 44 allow thinner wall sections to be used and therefore reduce the weight of the acoustic muffs. Ribs 44 may be seen more clearly in FIG. 2D which is a cross-section of the speaker/microphone cavity 38 taken along lines B—B of FIG. 2A.

Mounting aperture 48 formed in the second section 34b of flexible mounting hinge or arm 34 is utilized in mounting the muff 30 to terminal 10, and opening 50 is used in interconnecting the speaker/microphone cavity 38 with the mounting aperture 48 by way of a wire groove or tray 52.

Figure 3A:
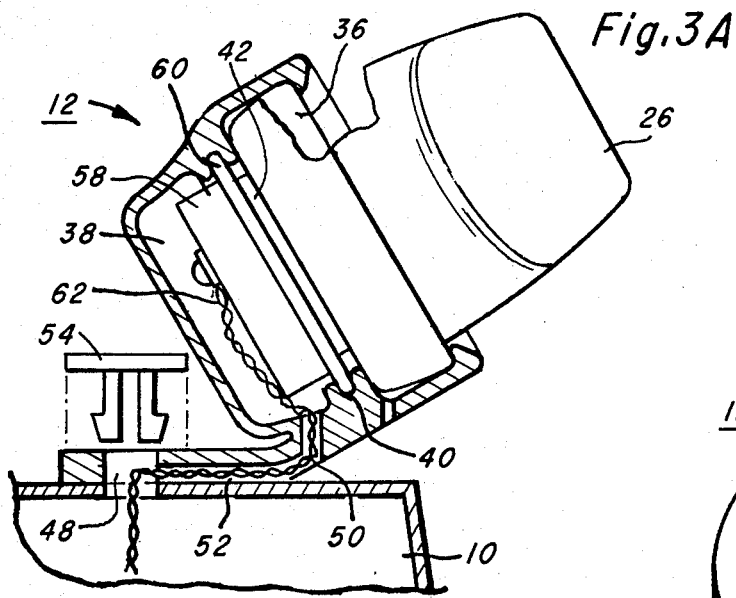
FIGS. 3A and 3B illustrate a cut-away side view and front view, respectively, of the microphone/earpiece acoustic muff.
Figure 4A:
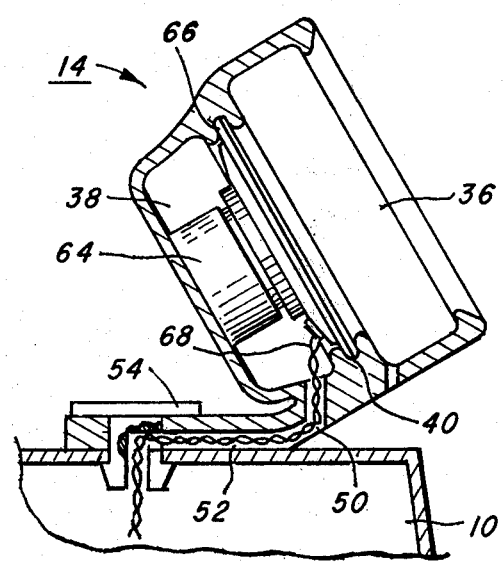
FIGS. 4A and 4B illustrate, respectively, a cut-away side view and front view of the speaker/mouthpiece acoustic muff.

Referring now to FIGS. 3A and 4A, there is illustrated in cross-section, respectively, the microphone/earpiece acoustic muff 12 and the speaker/mouthpiece muff 14. These two views are similar to the cross-section view shown in FIG. 2C with the exception that each muff 12 and 14 is attached to terminal 10. Acoustic muffs 12 and 14 are connected to terminal 10 by way of a screw or snap-in retaining pin 54 which passes through circular aperture 48 (as shown in FIG. 3A) and is shown in place in FIG. 4A. Retaining pin 54 is attached to terminal 10 with sufficient force to allow muffs 12 and 14 to move radially in the directions indicated by the arrows 56 in FIG. 1A. By having muffs 12 and 14 rotatably mounted to terminal 10 in this manner, handsets with varying center distances between earpiece and mouthpiece can be accommodated.

Microphone 58 is fitted within speaker/microphone cavity 38 by way of microphone circular lip 60 which is positioned within circular groove 40. Microphone leads 62 interconnect microphone 60 with the electronics in terminal 10 and pass through opening 50, wire groove 52 and circular aperture 48. In like manner, speaker 64 fits within speaker/microphone cavity 38 and is held in place by speaker circular lip 66 in circular groove 40.

Figure 3B:
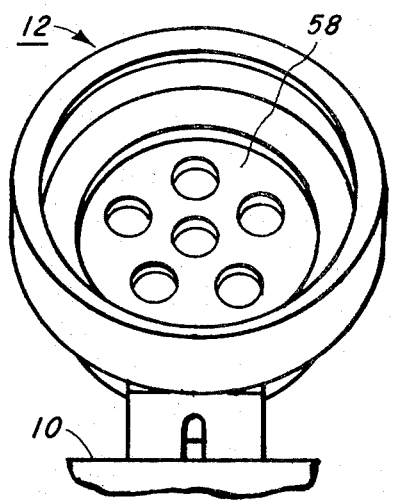
Figure 4B:
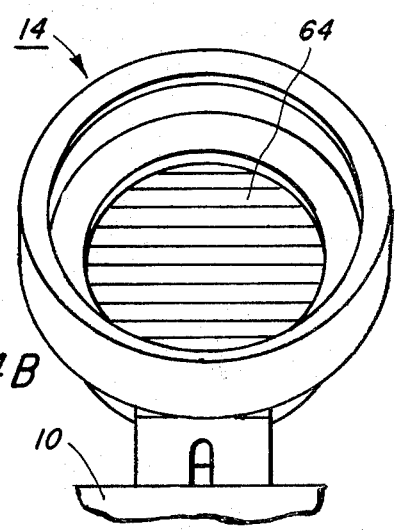

Speaker leads 68 pass through opening 50, wire groove 52 and circular mounting aperture 48 to the electronics (not shown) in input/output device 10. With the muffs 12 and 14 designed according to the present invention, microphone and speaker leads 62 and 68 are completely concealed and enclosed in the opening 50 and groove 52 of muffs 12 and 14. FIG. 3A shows earpiece 26 located in earpiece/mouthpiece cavity 36. As can be seen more clearly in FIG. 3A, an acoustic cavity 42 is formed between the front parts of microphone 58 and earpiece 26. FIGS. 3B and 4B illustrate front views of the microphone muff 12 and speaker muff 14 attached to terminal 10. FIG. 3B shows microphone/earpiece muff 12 without the earpiece 26 included therein.

Figure 5A:
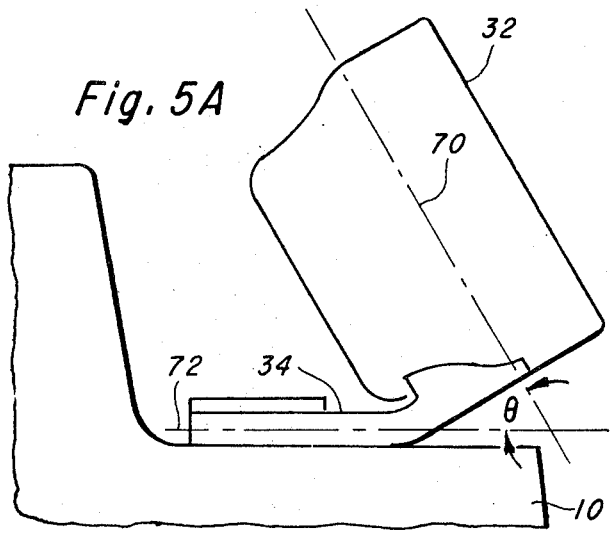
FIGS. 5A-5C illustrate, respectively, the acoustic muff according to the present invention in the normal position, the operating position and the stored position.
Figure 5B:
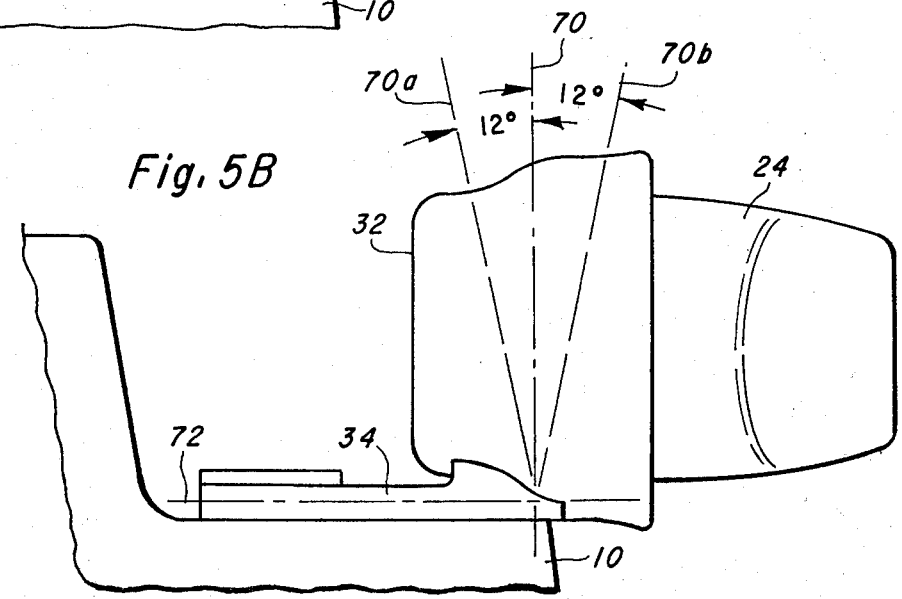
Figure 5C:
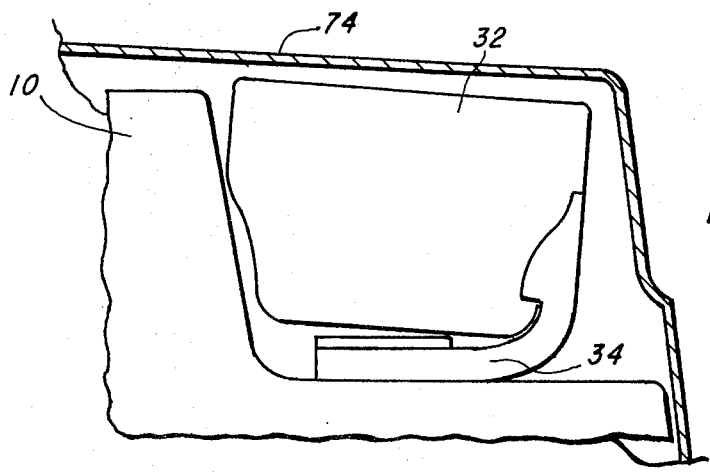

FIGS. 5A–5C illustrate the muff according to the present invention and in its normal position, its operating position and its stored position, respectively. In the normal position illustrated in FIG. 5A, the angle θ of the vertical center line 70 of housing 32 with respect to the horizontal center line 72 of flexible hinge 34 is less than 90° in the preferred embodiment; however, it should be noted that the angle θ of center line 70 with respect to center line 72 may equal 90°.

FIG. 5B illustrates the muff according to the present invention with the mouthpiece 24 inserted into housing 32. With the mouthpiece 24 inserted therein, housing 32 is moved or rotated such that the center line 70 of housing 32 is essentially at 90° with respect to center line 72. From a continuous operational point of view, it is desirable to have the telephone handset 16 (shown in FIG. 1A) and mouthpiece 24 at approximately 90° ± 12° (that is, in the range of 78° to 102°); center lines 70a and 70b illustrate the preferred operating variation of the center line 70 when the muff is in its normal operating position. Accordingly, the weight of mouthpiece 24 and the flexibility of arm 34 should be such that the preferred range of center line 70 of housing 32 can be obtained.

FIG. 5C illustrates the acoustic muff in its stored position. When cover 74 encloses terminal 10, housing 32 is forced by cover 74 to overlay mounting arm 34. Accordingly, a small amount of volume is required to completely enclose housing 32 by cover 74 which provides a compact storage volume of the input/output device 10 to be obtained.

Although the present invention has been shown and illustrated in terms of a specific apparatus, it will be apparent that changes or modifications can be made without departing from the spirit and scope of the invention as defined by the appended claims.

We claim:
1. A universal acoustic muff comprising:
   a housing including a speaker/microphone cavity and an earpiece/mouthpiece cavity separated by an acoustic cavity,
   a flexible mounting arm attached to said housing for mounting said housing, and
   means for rotatably mounting said arm to a member.

2. A universal acoustic muff system for electronically transmitting/receiving a signal to/from a telephone to/from an electronic input/output device comprising:
   a pair of elastic, generally circular housings, each of said housings comprising a speaker/microphone cavity and an earpiece/mouthpiece cavity separated by an acoustic cavity,
   flexible mounting arms attached to each of said housings, and
   means for rotatably mounting each of said arms to said input/output device to thereby accommodate varying center distances between the earpiece and the mouthpiece of said telephone.

3. The muff according to claim 2, wherein in its normal position, the angle of the vertical center line of each of said housings is equal to or less than 90° with respect to the horizontal center line of each of said arms.

4. The muff according to claim 3, wherein the angle of the vertical center line of each of said housings with respect to the horizontal center line of each of said arms is in the range of 78° to 102° when the telephone handset is inserted into said housings.

5. The muff of claim 2, wherein said housings and arms are made of an elastic material.

6. The muff according to claim 5, wherein said housings and arms are of thermoplastic rubber.

7. The muff according to claim 2, further including retaining ribs lining the inner portion of said speaker/microphone cavity to provide structural integrity.

8. The muff according to claim 2, wherein said means for rotating includes an aperture in said arm and a retaining pin interconnecting said arm with said input/output device.

9. The muff according to claim 8, wherein a wire groove interconnects said speaker/microphone cavity to said aperture.

10. A universal acoustic muff system for electronically transmitting/receiving a signal to/from a telephone to/from an electronic input/output device comprising:
   a pair of elastic, generally circular housings located exteriorally to said input/output device, each of said housings comprising a speaker/microphone cavity and an earpiece/mouthpiece cavity separated by an acoustic cavity,
   flexible mounting arms attached to each of said housing, wherein in their normal position the angle of the vertical center lines of each of said housings are less than 90° with respect to the horizontal center lines of each of said arms, and
   means for rotatably mounting each of said arms to said input/output device to thereby accommodate varying center distances between the earpiece and the mouthpiece of the telephone handset.

11. The muff system according to claim 10, wherein said arms comprise a first and second section, said first section attached to said housing and said second section attached to said first section, the vertical center line of said first section forming an angle of approximately 60° with respect to the horizontal center line of said second section.

12. The muff system according to claim 10, further including a cover to enclose said input/output device, said cover when in place moving each of said housings from their normal position to their stored position such that the rear portion of said housings overlays said mounting arms.

13. The muff system according to claim 12, wherein the angle of the vertical center line of each of said housings with respect to the horizontal center line of each of said arms is in the range of 78° to 102° when the telephone handset is inserted into said housings.

14. The muff according to claim 11, wherein said second portion of said arm includes a circular aperture and a retaining pin which interconnects said second portion of said arm to said input/output device.

15. The muff system according to claim 10, wherein a wire groove interconnects the speaker/microphone cavity to said circular aperture.

16. The muff system according to claim 10, wherein said housings and arms are made of an elastic material.

17. The muff according to claim 16, wherein said elastic material is thermoplastic rubber.

* * * * *